Inventors
William Jaeger
Carl Jaeger

By Clarence A. O'Brien
Attorney

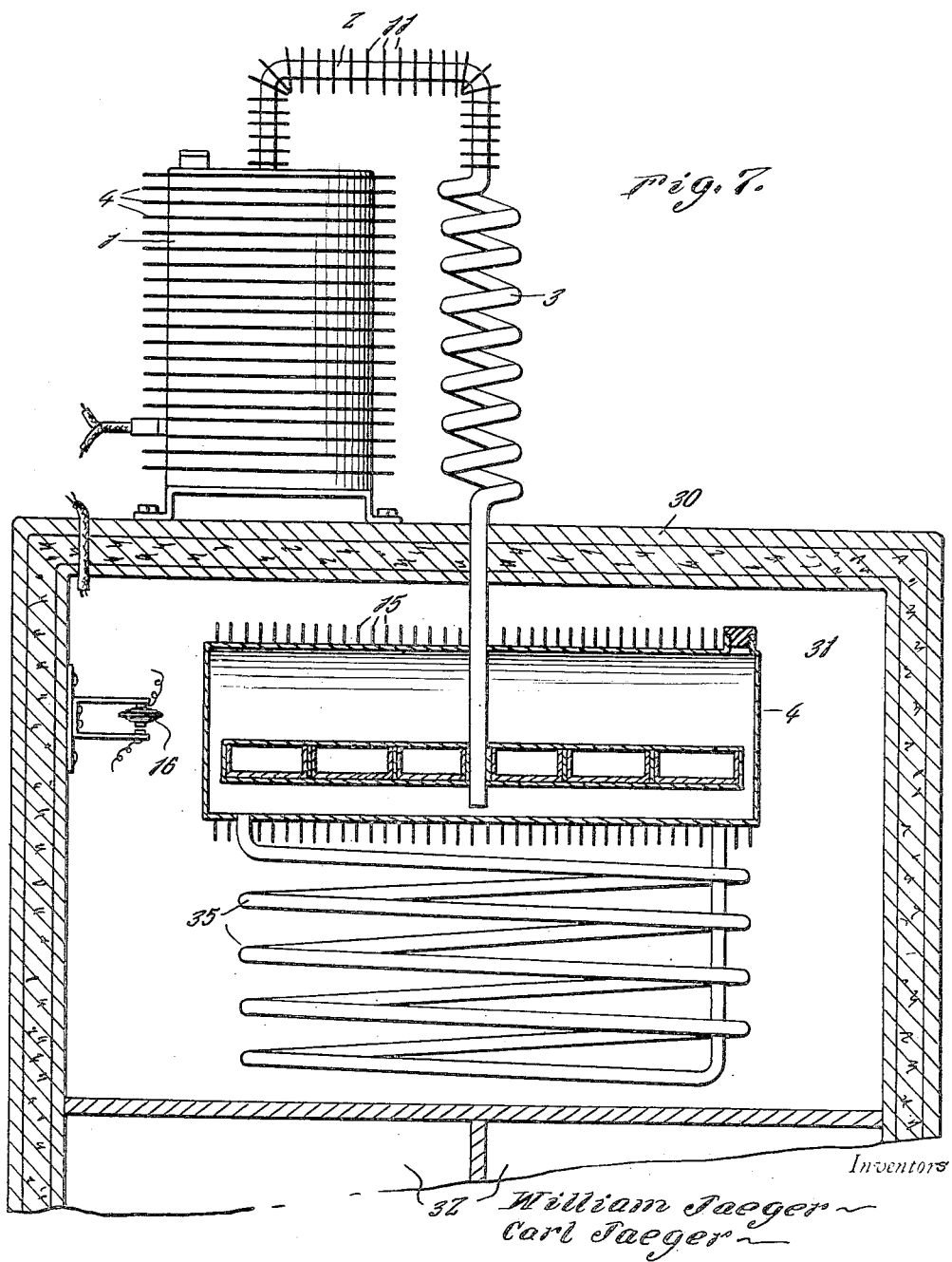

Patented Mar. 15, 1932

1,849,931

UNITED STATES PATENT OFFICE

CARL JAEGER AND WILLIAM JAEGER, OF LOS ANGELES, CALIFORNIA

ABSORPTION REFRIGERATING APPARATUS

Application filed June 14, 1928. Serial No. 285,419.

The present invention relates to new and useful improvement in an absorption refrigerating apparatus and has for its prime object to provide an apparatus of this nature which is simple in its construction, inexpensive to manufacture, economical to maintain, strong and durable, and thoroughly efficient and reliable in its use and operation.

Another object of the invention resides in the provision of an absorption refrigerating apparatus using no movable parts but in which a single pipe leads to and from the generator and serves both as a pressure and a suction pipe.

According to this invention the generator is constructed with proper fins for air cooling and no water is used.

With the above and numerous other objects in view as will appear as the description proceeds, the invention resides in certain novel features of construction, in the combination and arrangement of parts as will be hereinafter more fully described and claimed.

In the drawings:

Figure 7 is a view in vertical section of another embodiment of the invention.

Figure 1:
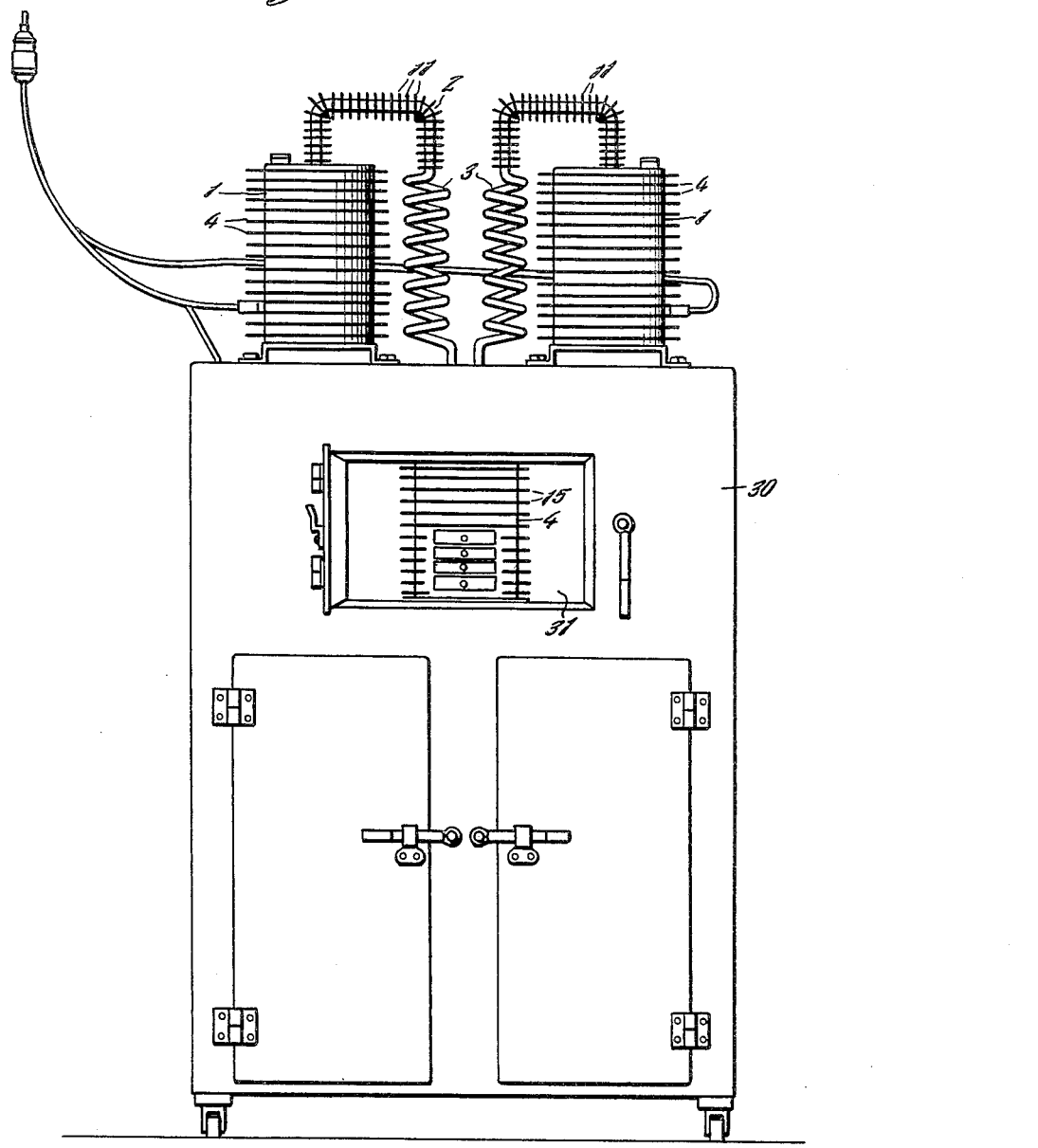
Figure 1 is a front elevation of a refrigerating apparatus embodying the features of my invention.
Figure 2:
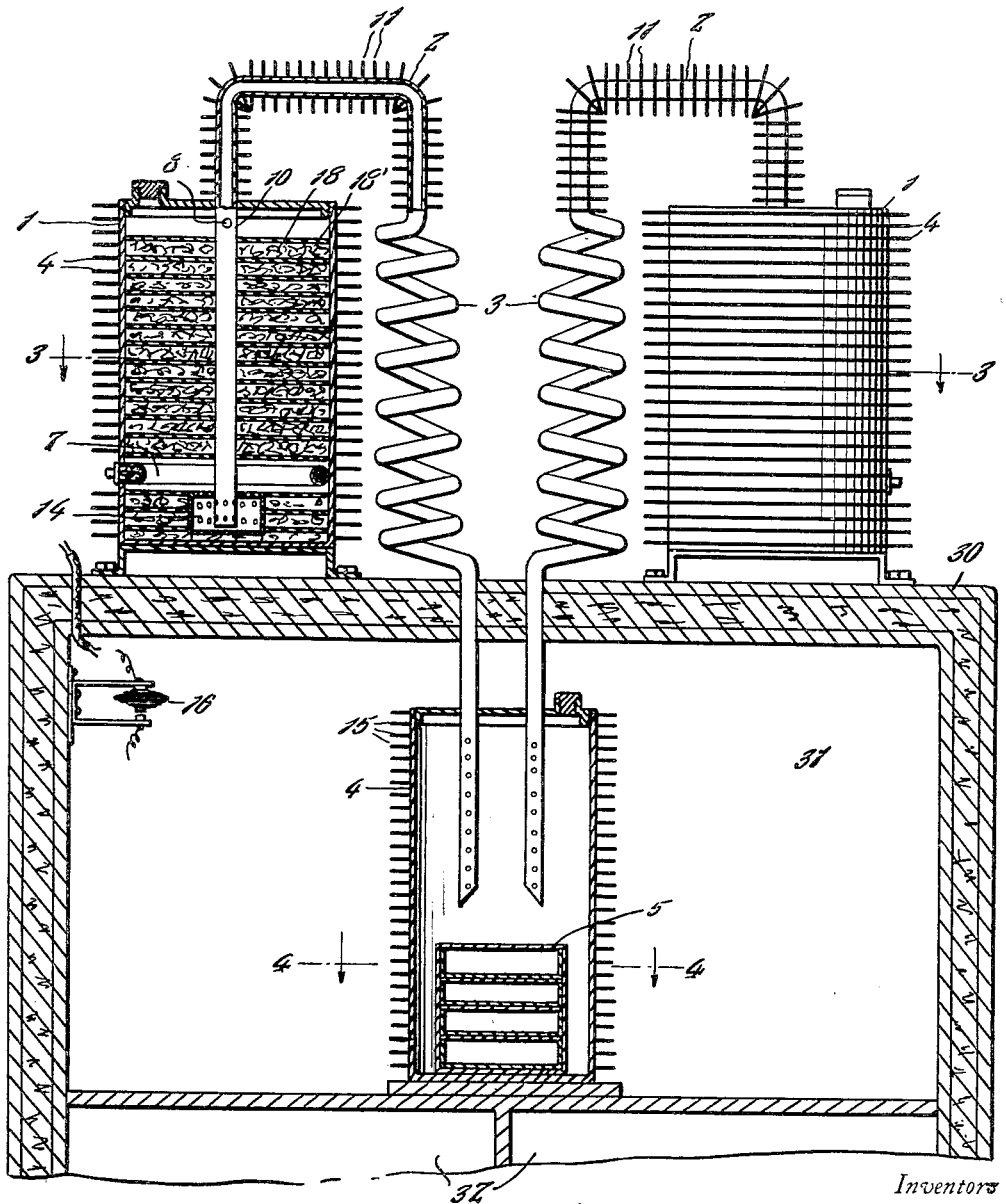
Figure 2 is a vertical section therethrough.
Figure 3:
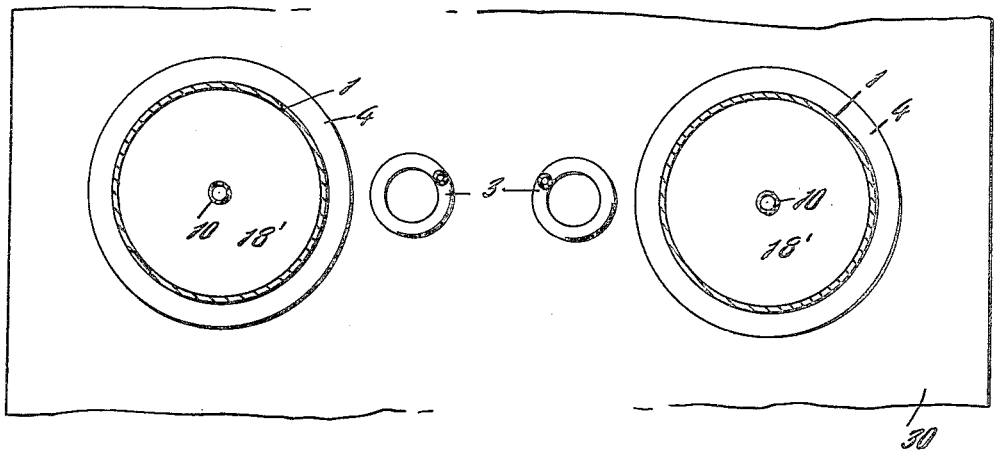
Figure 3 is a horizontal section taken substantially on the line 3—3 of Figure 2.
Figure 4:
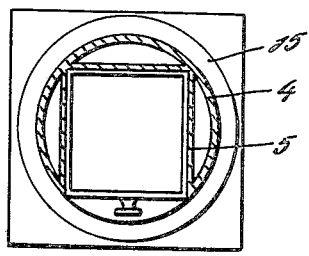
Figure 4 is a sectional view taken substantially on the line 4—4 of Figure 2.

Referring to the drawings in detail it will be seen that the numeral 30 denotes a box having suitably insulated walls and provided with a refrigerating compartment 31 at the top thereof and food compartment 32 at the bottom thereof.

The numerals 1 denote generators mounted on top of the box 30 and provided with proper fins 4 admitting of a rapid transfer of heat. Within each generator is the solid absorbent 18, the nature of which will be explained hereinafter.

The solid absorbent 18 is arranged in thin layers or in granulated form and between each layer is a granulated coconut charcoal absorbent 18' which transmits heat rapidly to the absorbent 18. This invention is based upon a long period of experiments. It has been found that the absorbent 18 cooperating with the absorbent 18' will absorb thirty six per cent of ammonia at fifteen degrees Fahrenheit forming a liquid.

A condenser pipe 2 is surrounded by copper fins 11 to take off the heat and in connection with the condensing coil 3 ending in evaporator 4 which has also copper fins 15 to give a greater cooling surface. The condenser pipe merges into an absorbent pipe 10 extending down through the top of the generator and terminating a distance above the bottom thereof in a sieve 14.

Figure 5:
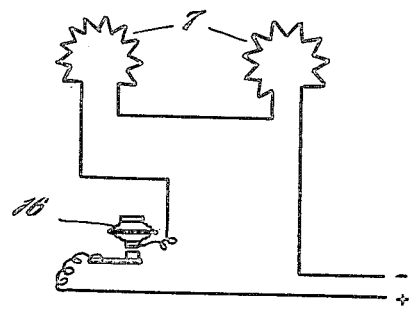
Figure 5 is a diagram of the thermostatic control circuit.
Figure 6:
Figure 6 is a perspective view of one of the coconut charcoal absorbent disks or layers.

The numeral 7 denotes a heating element connected with an automatic thermostat 16 in the compartment 31 as will be apparent from an inspection of the diagrammatic view in Figure 5.

Heat is transmitted from the heating element 7 into the absorbent 18 and this absorbent becoming hot, the heat thereof transforms the liquid into gas from the absorbent 18 and the gas passes out through a hole 8 through the condenser pipes 2 and coil 3 into the evaporator 4, the gas liquefying in the condenser.

In the lower part of the evaporator 4 there is located an ice mold 5.

After all the gas has been discharged from the generator 1 and the generator is cooled off, then it begins the reabsorption from the evaporator 5. This process is then repeated.

At the end of the absorption pipe 10 as explained above, is the sieve 14 constructed to protect the absorption pipe holes in the pipe 10. As soon as the absorbent 18 has absorbed the gas and the temperature in the compartment 31 has increased to fifty degrees Fahrenheit, the heater 7 is turned on automatically by action of the thermostat 16 located in the compartment 31.

To have a continuous process, I have constructed two automatically controlled generators 1—1, the operation of the refrigerator apparatus depends first on the filling of the generator with ammonia or other solution and then heat is applied to separate the gas from the absorbent.

In Figure 7 there has been disclosed a slightly different embodiment of the invention in that only a single generator 1 is utilized and the evaporator is disposed horizontally rather than vertically. In addition to these differences this embodiment includes an evaporation coil 35 connected with the evaporator at the ends thereof.

This embodiment operates in the same manner as that first described. Heretofore all absorption type refrigerators, whether operated by means of compression of gases by mechanical skill or by the application of heat, have used water as the absorbent.

The use of this element as an absorbent, requires an operative device acting as a pump to remove all the water from the refrigeration or cooling unit, as water under the pressure applied by either method, will in time congeal in the cooling unit in sufficient quantity to prevent proper action of the refrigerating unit.

In my refrigerating apparatus I utilize a solid inert mass which will remain in the condition in which it is originally installed, indefinitely and which will absorb thirty eight per cent of its cubical contents in refrigerating gas.

This permits the use of the apparatus described above with no moving parts and operated entirely by the application of heat.

A practical embodiment of the solid used as an absorbent is formed from the following chemicals in powdered form:

15 per cent silicon dioxide
6 per cent white chalk
6 per cent aluminate of sodium
8 per cent kaolin
10 per cent carbonate soda
15 per cent permanganate of potash
18 per cent chloride of calcium.

These ingredients are mixed together with 22 per cent of napthalene until the mass becomes a paste. The paste is formed into thin layers or in ball form and heated to a temperature of 425° F. At this temperature all the napthalene will have escaped as a gas and in the process will have formed fine pores or openings throughout the solid.

The application of heat is continued to the substance until it hardens to solid, brick like plates, and then is allowed to cool to normal temperature.

The interstices formed between the layers of this material are filled with granulated charcoal used in this combination as a rapid conductor of heat.

A very important feature of this invention resides in the provision of the thermostatic absorption refrigerating air cooled apparatus described which provides a simplified operation in connection with the absorption of vapors and gases by a solid absorber without any moving parts.

The gasified refrigerant is liquefied by cooling and pressure then allowed to boil through the thermo-contact with space to be refrigerated. Assume, two cylinders, one of which contains the solid absorbent which has absorbed its fill of refrigerant, the other being located in the ice box being empty, the two being connected by a condenser pipe.

As heat is applied to the generator containing the solid absorbent and refrigerant, the refrigerant will be evaporated and driven off. The refrigerant under pressure when vaporized and driven from the solid absorbent is cooled on the way to the cylinder and consequently reliquefied.

The condition now is that the liquid ammonia or other liquid gas in the cylinder in the refrigerator and the hot absorbent in the other. The hot absorbent when cooled, exerts an absorptive attraction upon the refrigerant, permits the liquid to boil in the refrigerating cylinder, thus cooling the refrigerator during the absorption cycle.

The heat of the solution of the gas in the absorption must be removed by radiation from the now cooling heater. Heat again must be furnished to drive the gas out of the solution in the generating cycle. The solid absorbents used instead of water, simplify the apparatus and the heat used is not so great in dissolving the gas.

It is thought that the construction, operation, utility and advantages of this apparatus will now be clearly understood by those skilled in this art without a more detailed description thereof.

The present embodiments of this invention have been disclosed in detail for the purposes of exemplification since in actual practice they attain the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. A refrigerating apparatus comprising a combined generator and absorption chamber, a stationary granular cooling agent constituting a primary porous absorbing agent stratified within the generator, a secondary absorbent positioned alternated with respect to the primary agent and having a higher heat attraction than said primary agent.

2. A refrigerating apparatus comprising a generator, an evaporator, a conduit connecting the generator with the evaporator, a coil formed in the intermediate part of the conduit, layers of solid absorbent material located in the generator and other layers of solid absorbent material in the generator and placed between the first layers, the second layers having a higher heat attraction than the other layers.

In testimony whereof, we affix our signatures.

CARL JAEGER.
WILLIAM JAEGER.